United States Patent [19]
Thévenaz

[11] 3,873,046
[45] Mar. 25, 1975

[54] PROJECTION CASSETTE

[75] Inventor: Louis Thévenaz, Sainte-Croix, Switzerland

[73] Assignee: Bolex International SA, Sainte-Croix, Switzerland

[22] Filed: Oct. 30, 1973

[21] Appl. No.: 410,992

[52] U.S. Cl. ................................ 242/199, 352/72
[51] Int. Cl.... G03b 1/04, G11b 15/32, G11b 23/04
[58] Field of Search ........................... 242/197–200; 352/72, 78

[56] References Cited
UNITED STATES PATENTS

| | | | |
|---|---|---|---|
| 2,466,524 | 4/1949 | Williams | 352/78 R |
| 3,677,497 | 7/1972 | Lowry et al. | 242/199 |
| R21,435 | 4/1940 | Scheibell | 352/72 X |

Primary Examiner—Leonard D. Christian

[57] ABSTRACT

A cinematographic film projection cassette comprising a case, a first cavity for a standard film spool, a second cavity for a take-up core, a lid movably attached to the case and an element for locking the cassette, and having inner guide surfaces for guiding the film round the inside corners of the case, and second opposing ribs for confining the path of the film to the plane common with the film spool and take-up core to ensure a regular winding of the film onto the take-up core. Wings on the take-up core retain it in a predetermined position relative to the case and film spool, and a buffer surface limits the displacement of the spring element to prevent breaking thereof. A key is provided to lock the lid and case in a closed and operative condition.

14 Claims, 5 Drawing Figures

4. During use the cassette is closed, i.e. the lid 1 is turned back onto the case 2 to which it is connected by two hinges 9.

The take-up core has two wings 10 which fit into a ring-shaped groove in the bottom of the cassette, thus preventing it from being displaced from its normal working position. As seen in FIG. 2, the take-up core 4 is made up of a cylindrical part 13 around which the film is wound after projection and a second cylindrical part which joins the wings 10 to the cylinder 13 and which extends outside the bottom of the case through an opening 14.

The opening 14 is elliptical in order that the take-up core can move further in a transverse direction than in a longitudinal direction (See FIG. 1).

In a preferred embodiment there are three radial ribs 15 in the bottom of the case which correspond with three radial ribs 16 inside the lid. When the cassette is closed, the film, after projection, is guided by these ribs precisely between these ribs and the coils of film come to lie upon each other exactly in place between the flanges of the feed spool.

The cassette also includes an elastic strip on the case which forms a spring shutting device 20 when the catch on the upper part fits into a recess 21 in the lid, thus holding the cassette closed. The cassette may be locked by a screw which passes through an opening 17 in the lid which coincides, when the cassette is closed, with a threaded hold 18 in a thicker part 19 of the case. The head of this screw is countersunk into the lid and may be hidden with a label.

Indentations 22 in the lid of the cassette are provided to correspond with a predetermined coded projector having corresponding male projections to mate with these indentations.

FIG. 3 shows an open cassette the lid 1 of which is turned back in the same plane as the case 2. Inside each of the four corners of the case is a curved inner film guiding surface 30 which prevents the film from getting caught up, particularly at the splices, in the corners of the case. The curved surfaces should have a radius slightly greater than that of the outer coils of one of the rolls of film. They are preferably made of plastic moulded in one piece with the case.

A key 32 which is used to lock the cassette is stored in longitudinal trough 31 formed in the bottom of the case. This key is attached by one of its extremities to one side of the trough 31 and preferably key 32 is moulded in one piece with the rest of the case of the cassette.

FIGS. 4 and 5 show the key 32 in greater detail. There is a catch at one end 33 and at the other end there are two flexible prong-like members 34, at least one of which has a catch 35 at the end thereof. When the lid 1 is closed onto the case 2 the opening 36 coincides with the opening 37 in the lid. The key 32, detached from the bottom of the case to which it is attached by a thinner strip of plastic, is inserted through the opening 37 and into the opening 36 in the case, in order to lock the cassette. The two plastic members 34 are slightly wider than the narrow part 38 of the opening 36 which causes members 34 to be pressed together when the key is introduced into the opening. When the catch 35 reaches the wider part 39 of the opening 36, the two members 34 spring apart to lock the assembly. The lid may thus be locked onto the case by the catches at the end 33 of the key 32 and the end 35 of one of the members 34.

It is advantageous in the case of rented cassettes for the end 33 of the key 32, the profile of which is within the thickness of the lid, to be covered with an adhesive label thus preventing the user from opening the cassette. In order to unlock the cassette, the two members 34 are manually squeezed together thus disengaging the catch at the end 35 of one of the members and then to slide the key 32 along the slot 38 towards the end 33.

When the cassette is closed, the free end of the spring element 20 (FIG. 4) is introduced into a rectangular opening in the lid. This free end has a hook or catch 41 which engages on the upper edge of one of the walls of the rectangular opening. The spring element 20 which comprises an elastic strip is pushed back, thus disengaging the hook 41 when the cassette is to be opened. The dimensions of the said rectangular opening are such that the spring element 20 cannot be pushed beyond the limits of its elasticity.

It is apparent that various modifications can be made to the examples disclosed herein without departing from the spirit and scope of the present invention.

What is claimed is:

1. A cinematographic film projection cassette comprising a case, a first cavity for a standard film spool, a second cavity for a take-up core, a lid movably attached to the case and a spring element for locking the cassette, and having first means for guiding the film round the inside corners of the case, and second means for confining the path of the film to the plane common with the film spool and take-up core to ensure a regular winding of the film onto the take-up core, third means for retaining the take-up core in a pre-determined position relative to the case and film spool, fourth means for limiting the displacement of the spring element to prevent breaking thereof and a key to lock the lid and case in a closed and operative condition.

2. A projection cassette as set forth in claim 1 in which the first means comprises curved inner surfaces the radius of which is greater than the radius of the outer coils of the roll of film to be housed in the cassette.

3. A projection cassette as set forth in claim 2 in which the curved inner surfaces are made of plastic moulded in one piece with the entire cassette.

4. A projection cassette as set forth in claim 1 in which the second means comprises radial ribs extending from the take-up core position formed on the bottom of the case and inside the lid such that when the cassette is closed, corresponding ribs on the lid and case cooperate to confine the top and bottom edges of the film to confine its travel path within the space between said ribs.

5. A projection cassette as set forth in claim 1 in which the third means comprises at least two wing members positioned in a ring-shaped recess in the bottom of the case.

6. A projection cassette as set forth in claim 1 in which said spring element comprises a leaf spring and said fourth means comprises a buffer surface positioned to limit the leaf spring movement so that its maximum deformation is less than the limit of its elasticity.

7. A projection cassette as set forth in claim 6 in which the said buffer surface comprises one of the walls of an opening through which the said spring element passes when the cassette is closed.

3,873,046

PROJECTION CASSETTE

FIELD OF INVENTION

The present invention relates to film cassettes for cinematographic projectors having a case, a pressure plate with a film-gate, a take-up core for the film and a lid attached to the case by a hinge, and more particularly to a new and improved cassette with a case that has a first cavity designed to receive a conventional film spool, e.g. a super 8 spool, and a second cavity which receives the take-up core.

BACKGROUND OF INVENTION

Film cassettes for cinematographic projectors already exist which can contain two rolls of film lying side by side on the same plane, the film unrolling from a standard spool, e.g. super 8, onto a take-up core.

One of the side walls of the cassette has a pressure plate with a film-gate. The film unwinds from the spool over the pressure plate and in front of the projection gate before winding onto the take-up core. After the film to be projected is introduced into the cassette and the leader of the film has been fixed onto the take-up core, the cassette is then closed by means of a lid.

In the existing cassettes the take-up core sometimes slips out of its correct position when the lid is closed. The film then binds between the case and the lid and cannot be turned normally by the projector. Furthermore, the coils of film as they are wound onto the take-up core after projection do not always fall into position regularly and rub against the flanges of the feed spool. This causes friction which prevents the spool from unwinding normally, thus causing a lack of film slack.

The present invention proposes to remedy these drawbacks by providing a projection cassette in which the take-up core remains constantly in its correct working position and in which the coils of film fall into position regularly one upon the other on the take-up winding so that the roll of film forms without excessive friction on the flanges of the spool.

SUMMARY OF INVENTION

The present invention provides means which maintain the take-up core in its correct working position and at least one guiding surface which causes the coils of projected film to fall into place regularly onto the take-up winding.

In a preferred embodiment the means of maintaining the take-up core in its correct working position consists of two wings positioned in a ring-shaped space in the case of the cassette. The guiding surfaces of the projected film consist of radial ribs on the bottom of the case of the cassette and on the inside of the lid between which the roll of film is guided very precisely as it increases in diameter.

It is particulary convenient to join the lid to the cassette by means of hinges and to provide a closing spring element by which the lid may be locked in position onto the case simply by pressure.

In another embodiment of the invention the lid is designed to be screwed onto the case.

A further objective of this invention is to facilitate the use of the cassette to ensure its correct functioning and its reliability in all circumstances. This objective is achieved to a high degree by comprising means of guiding the film round the inside corners of the case and all along its course inside the cassette, means of protecting the closing element from breakage and a key to lock the lid. It is characteristic of projection cassettes according to the invention that they may be used without risk to transport film even if the film is slightly buckled or warped or has been spliced and that the lid may be securely locked.

In a cassette according to the invention, the film is guided with high reliability by providing curved surfaced inside the corners of the case, the radius of which should be slightly greater than that of the outside coil of the film. Such a cassette can be manufactured economically if the guiding surfaces, preferably of plastic, are moulded in one piece with the entire cassette.

The closing spring element can be protected from rupture by a buffer which limits its distortion to within the limits of its elasticity. In a preferential form, this buffer is one of the walls of an opening either in the lid or in the case of the cassette through which the free end of the spring passes, the spring being in the form of a narrow strip attached at one end to the case or the lid.

The key for locking the cassette has at each of its extremities at least one catch which clips onto the lid and the case respectively. To lock the cassette, the key is introduced into two corresponding openings in the lid and the case so that said edges of the key are against the edges of the openings. If the key has two elastic strips at one end, at least one of which has a catch as described above, it can be introduced with ease and the cassette can be securely locked. When the key is in position for locking the cassette, the upper part is sunk in a hollow in the case which can be entirely covered by an adhesive label. This is particularly indicated for rented cassettes, the contents of which should not be accessible.

The key is joined by any suitable means to the cassette in order to avoid its loss. In a preferential form the key is moulded in one piece with the case and can simply be broken off at a place where the plastic is less resistant. However, it is also possible for it to be held to the cassette by an adhesive.

DETAILED DESCRIPTION

The present invention will be better understood with reference to the detailed description and to the accompanying drawings in which.

Figure 1:
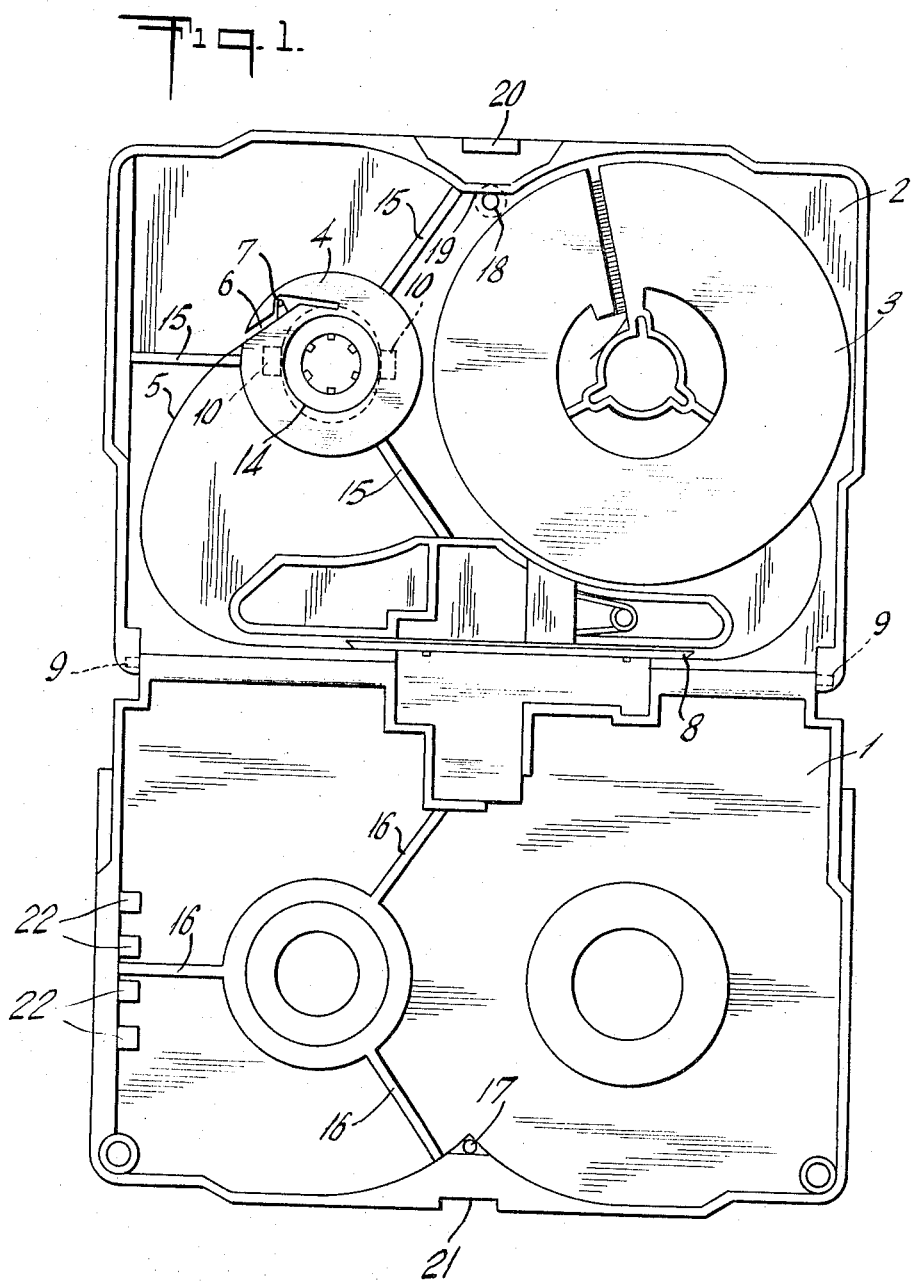
FIG. 1 shows a top view of a cassette according to the invention in which there is a take-up core and the case of which is connected to a lid.
Figure 2:
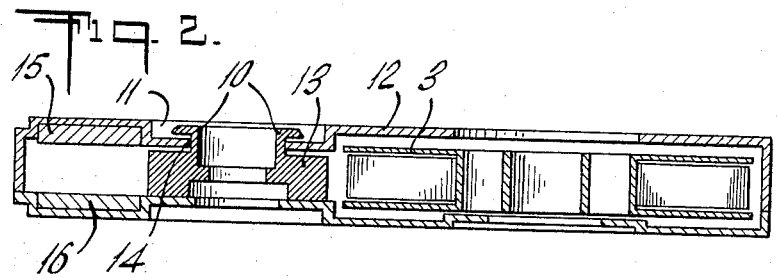
FIG. 2 is a section of the cassette shown in FIG. 1.
Figure 3:
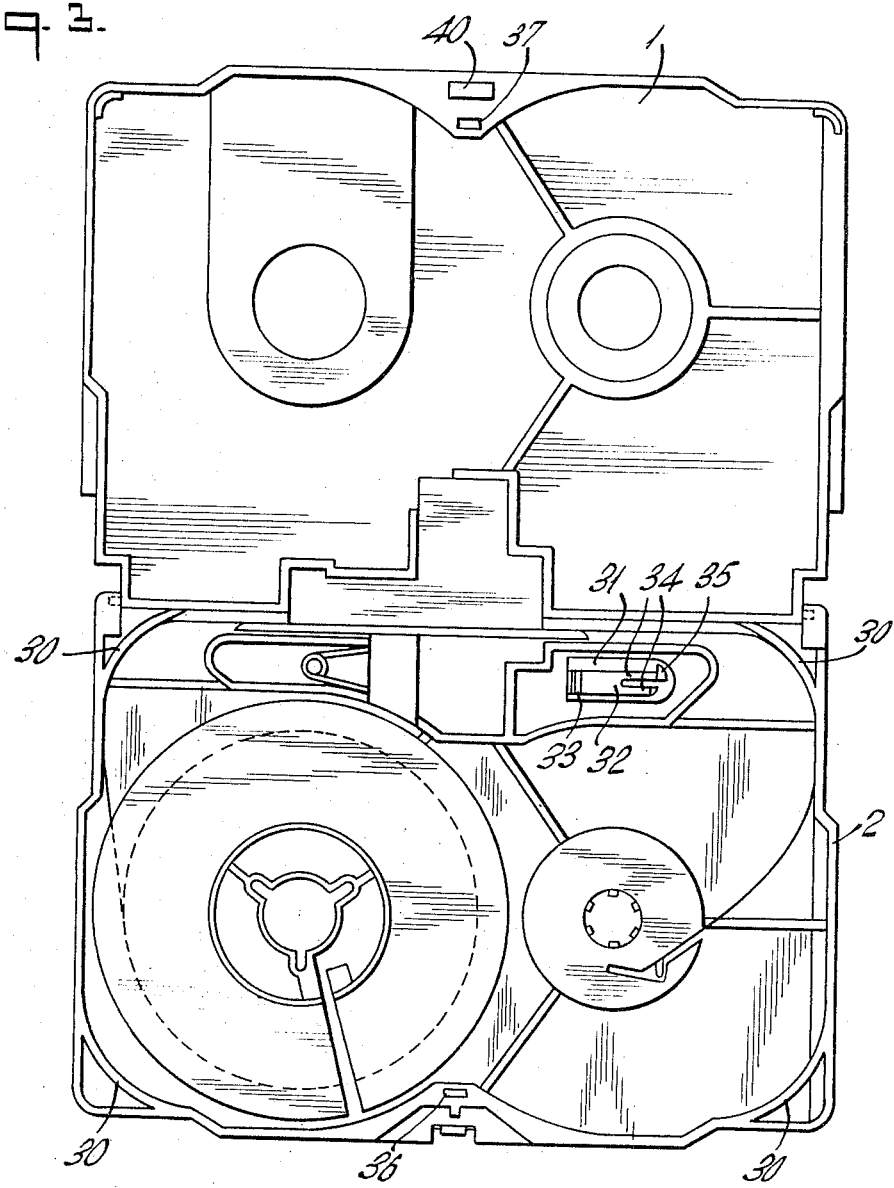
FIG. 3 is a top view of a cassette according to the invention showing the method of guiding the film.
Figure 4:
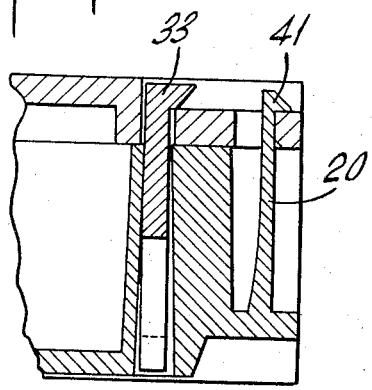
FIG. 4 is an enlargement of a section of part of the cassette shown in FIG. 4.
Figure 5:
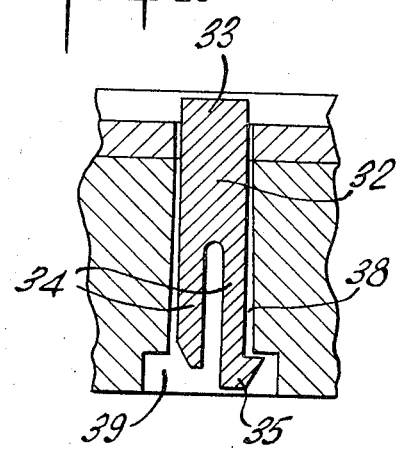
FIG. 5 is a greatly enlarged view of the key when it is in position locking the cassette.

FIG. 1 shows a cassette according to the invention opened with the lid turned back from the case 2. The case contains a standard spool, e.g. super 8, and a take-up core 4 onto which the film is wound. The beginning of the film 5 which is to be unwound from the spool 3 is introduced in the usual manner into a tangential slot in the take-up core 4 and it is kept in place by a tooth 7 which enters one of the perforations of the of the film.

During projection the film unwinds from the feed spool, passes over the pressure plate 8 and in front of the film-gate before being wound onto the take-up core

8. A projection cassette as set forth in claim 7 in which the said opening is formed in the lid or case of the cassette and the spring element is carried by the other of said lid or case.

9. A projection cassette as set forth in claim 1 in which the key for locking the cassette has at each of its ends at least one catch which in the locked position operatively locks into the lid and the case simultaneously.

10. A projection cassette as set forth in claim 9 in which said key is brought into a locked position through two adjacent openings when the cassette is closed, one opening being in the lid and the other being in the case and in which the catches at the opposite ends of the said key locks onto the edges of said openings.

11. A projection cassette as set forth in claim 9 in which the locking key has at one of its ends two flexible members at least one of which has said catch formed at the end thereof.

12. A projection cassette as set forth in claim 9 in which the lid or case includes a recess to house one end of the key when in the locked position so that the outer surface of the lid or case may be covered by a label.

13. A projection cassette as set forth in claim 9 in which the key is made of plastic moulded simultaneously with the rest of the cassette and which is joined to the lid or case by a zone of plastic of reduced thickness to facilitate breakage therealong for key removal.

14. A projection cassette as set forth in claim 9 in which the key is held to the lid or case in a stored position by an adhesive.

* * * * *